US008527325B1

(12) United States Patent
Atreya et al.

(10) Patent No.: US 8,527,325 B1
(45) Date of Patent: Sep. 3, 2013

(54) SYSTEM AND METHOD FOR ALLOCATING LABOR TO UNITS PROCESSED IN A MATERIALS HANDLING FACILITY

(75) Inventors: Ranganath Atreya, Mercer Island, WA (US); Sujeevan Rajayogam, Seattle, WA (US); Matthew S. Dingfield, Puyallup, WA (US); Kinsley O. Ogunmola, Seattle, WA (US); Jai Modi, Bellevue, WA (US); Babitha Achutha, Bellevue, WA (US); Robert D. McDonald, Jr., Seattle, WA (US); Samir Kumar, Issaquah, WA (US); Eric Young, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 666 days.

(21) Appl. No.: 12/624,387

(22) Filed: Nov. 23, 2009

(51) Int. Cl.
*G06Q 10/00* (2012.01)

(52) U.S. Cl.
USPC .......... 705/7.38; 700/214; 700/108; 700/216; 700/100; 700/213; 705/28; 705/7.42

(58) Field of Classification Search
USPC ................ 705/7, 38, 7.42, 28; 700/214, 108, 700/216, 100, 213
See application file for complete search history.

(56) References Cited

U.S. PATENT DOCUMENTS

| | | |
|---|---|---|
| 5,918,219 A | 6/1999 | Isherwood |
| 6,356,875 B1 | 3/2002 | Green et al. |
| 6,446,053 B1 | 9/2002 | Elliot |
| 7,249,028 B2 | 7/2007 | Ibarra et al. |
| 8,086,467 B2 * | 12/2011 | Jin et al. .......................... 705/1.1 |
| 2006/0079979 A1 * | 4/2006 | Giebels et al. .................. 700/96 |
| 2011/0131082 A1 * | 6/2011 | Manser et al. ............... 705/7.42 |

OTHER PUBLICATIONS

Li et al., Influencing factors of job waiting time variance on a single machine, European J. Industrial Engineering, vol. 1, No. 1, 2007, p. 56-73.*
Ye et al., Job scheduling methods for reducing waiting time variance, Computers & Operations Research 34, 2007 (available online Dec. 27, 2005), p. 3069-83.*
Eilon and Chowdhury, Minimizing Waiting Time Variance in the Single Machine Problem, Management Science, vol. 23, No. 6 (Feb. 1977), p. 567-75.*
Xu and Ye, Minimization of Job Waiting Time Variance on Identical Parallel Machines, IEEE Transactions on Systems, Man, and Cybernetics—Part C: Applications and Reviews, vol. 37, No. 5, Sep. 2007, p. 917-27.*
Nadoli and Pillai, Simulation in Automated Material Handling Systems Design for Semiconductor Manufacturing, Proceedings of the 1994 Winter Simulation Conference, 1994, p. 892-899.*

* cited by examiner

*Primary Examiner* — Justin M Pats
(74) *Attorney, Agent, or Firm* — Robert C. Kowert; Meyertons, Hood, Kivlin, Kowert & Goetzel, P.C.

(57) ABSTRACT

Various embodiments of a system and method for allocating labor to units processed in a materials handling facility are described. Embodiments may include a labor allocation system configured to receive information associated with a materials handling process that includes handling multiple units. For each unit, such information may indicate a respective pre-handling time period and a respective post-handling time period. The labor allocation system may determine a measure of variability of the pre-handling time periods associated with the units. The labor allocation system may also determine a measure of variability of the post-handling time periods. In response to determining that one of the measures of variability is less than the other, the labor allocation system may determine that each time period associated with the lesser measure of variability is representative of a quantity of labor expended to process a respective unit in accordance with the materials handling process.

39 Claims, 9 Drawing Sheets assign an operation status to a materials handling process, the operation status indicating whether labor for the materials handling process is expended before or after the handling of items
610 periodically (or aperiodically) evaluate agent performance with respect to the operation status for that materials handling process
612 generate one or more recommendations based on that evaluation
614

*FIG. 6B*

SYSTEM AND METHOD FOR ALLOCATING LABOR TO UNITS PROCESSED IN A MATERIALS HANDLING FACILITY

BACKGROUND

Various applications of the Internet, and of the web, involve marketplaces that provide goods and/or services for sale. For instance, consumers may visit a merchant's website to view and/or purchase goods and services offered for sale by the merchant (and/or third party merchants). Some network-based marketplaces (e.g., Internet- or web-based marketplaces) include large electronic catalogues of items offered for sale. Distributors that operate such marketplaces may store inventory of items in one or more facilities (e.g., warehouses, distributions centers, etc.). In some cases, distributors may operate an entire fulfillment network that includes multiple facilities spread across a large geographical area. Due in part to the vastness of such fulfillment networks, even small inefficiencies can be compounded to significantly impact the network as a whole. Such inefficiencies can adversely impact a fulfillment network's ability to maintain requisite throughput, which among other things can ultimately impact a customer's marketplace experience in a negative manner. One source of inefficiencies in a fulfillment network may be inefficient use of labor. Labor allocation may be difficult to determine in fulfillment networks.

BRIEF DESCRIPTION OF THE DRAWINGS

FIGS. 6A-B illustrate flowcharts of example methods that may be performed by a labor allocation system, according to some embodiments.

Figure 1:
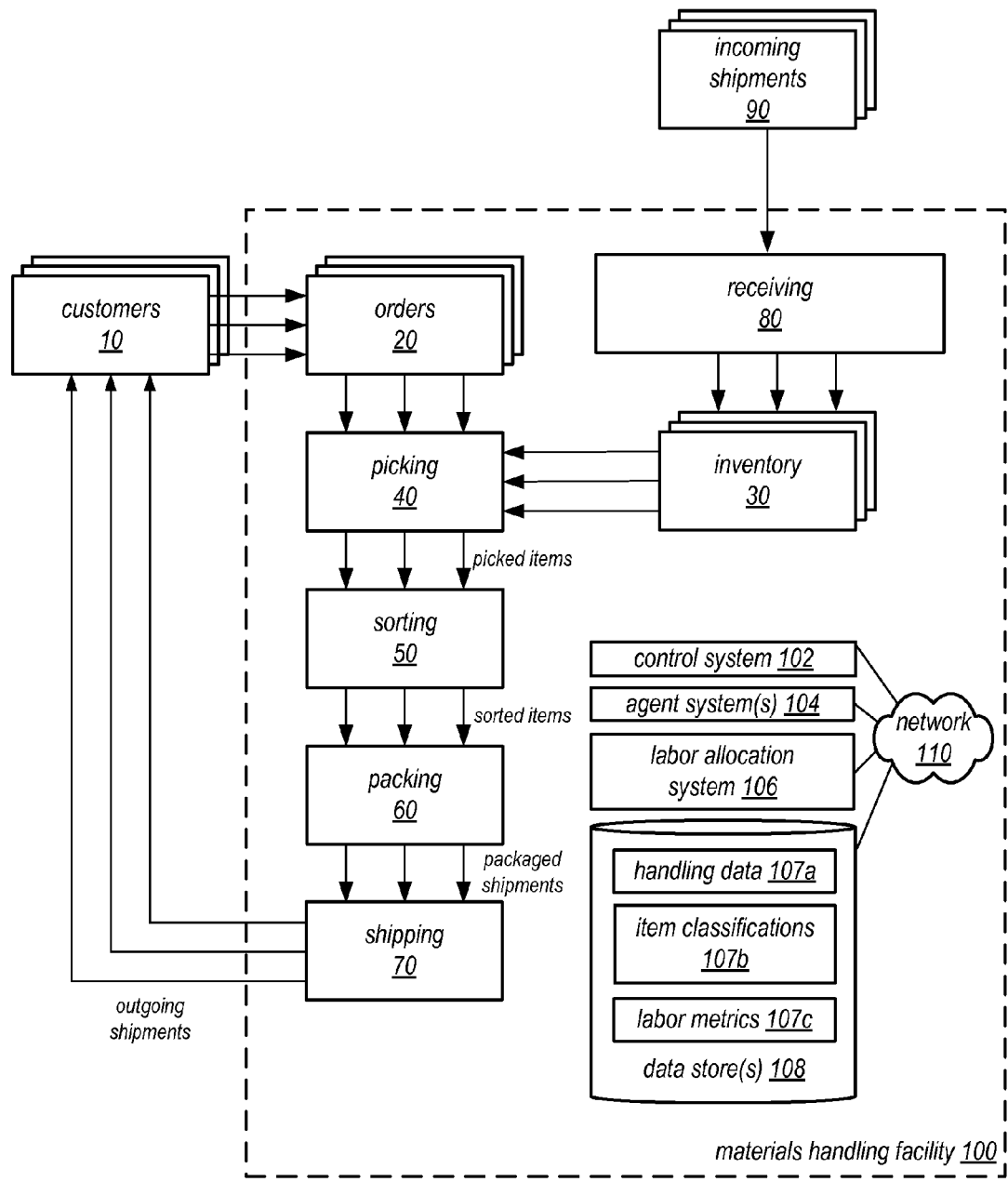
FIG. 1 illustrates a logical representation of a materials handling facility in the system and method for allocating labor to units processed in a materials handling facility, according to some embodiments.

While the system and method for allocating labor to units processed in a materials handling facility is described herein by way of example for several embodiments and illustrative drawings, those skilled in the art will recognize that the system and method for allocating labor to units processed in a materials handling facility is not limited to the embodiments or drawings described. It should be understood, that the drawings and detailed description thereto are not intended to limit the system and method for allocating labor to units processed in a materials handling facility to the particular form disclosed, but on the contrary, the intention is to cover all modifications, equivalents and alternatives falling within the spirit and scope of the system and method for allocating labor to units processed in a materials handling facility as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for allocating labor to units processed in a materials handling facility are described. Such embodiments may include a labor allocation system configured to attribute accurate quantities of labor to the units processed by such labor. For example, a materials handling facility may include multiple agents performing materials handling processes on various units within the materials handling facility. Such processes may be related to receiving, stowing, picking, sorting, packing, shipping or any other materials handling activity described herein. In various embodiments, units may be processed in sequences within the materials handling facility. For instance, in one example an agent at a packing station may perform a packing process on a sequence of units, such as units arriving at the packing station via conveyor belt (or other conveyance system). The sequences of units processed according to such packing process (or any other materials handling process) may be heterogeneous in nature (e.g., the units may represent different types of items, at least some having different physical characteristics than others).

The labor allocation system described herein may be configured to receive or otherwise access a temporal indication of when a unit is processed according to a materials handling process (e.g., an absolute time, a relative time relative to some base time, etc.). For example, as the aforesaid agent packs units at the packing station, he may scan each unit with an agent system (described in more detail below). The agent system may generate an item handling message that indicates the particular unit was handled or touched at a particular time (such message may include other information as described in more detail herein). Note that instances of such handling or touching may but need not include instances in which the agent physically comes into contact with the unit being processed. For instance, the wireless or optical scanning of a unit may represent the handling of an item, even though such handling does not require the agent to actually touch or come into physical contact with the unit at the time of such scanning. As used herein, the term "handling" or "touching" an item may include identifying a unit with or without an agent physically coming into contact with that unit, such as through wireless or optical scanning techniques. The item handling message may be sent to the labor allocation system either directly or through one or more intermediary systems, such as a control system of the materials handling facility.

In various embodiments, the collection and aggregation of item handling messages are part of a normal mode of operation of a materials handling process. For example, each materials handling process may be associated with an operating procedure (sometimes referred to as a standard operating procedure, or "SOP") that specifies actions to be taken as part of completing such process. The collection of item handling messages may be specified by such procedure as a normal part of completing the procedure. For instance, the procedure may include instructions that specify an agent is to scan or otherwise identify an item, which may result in the creation of an item handling message. In this way, such collection and/or aggregation does not introduce additional processing overhead into the materials handling processes. Likewise, utilizing such item handling messages, such as described herein with respect to various embodiments, does not introduce additional processing overhead into the materials handling processes.

Based on such item handling messages, the labor allocation system described herein may be configured to determine a pre-handling time period and a post-handling time period for each of the units processed in the aforesaid sequence of units. For a given unit and given materials handling process, the labor allocation system may in various embodiments determine the pre-handling time to be a period of time between the time indicated by the item handling message for the given unit and the time indicated by the item handling message of the previous unit in the sequence of units processed according to that materials handling process. For the same unit and materials handling process, the labor allocation system may determine the post-handling time period to be a period of time between the time indicated by the item handling message for the given unit and the time indicated by the item handling message of the subsequent unit in the sequence of units processed. The labor allocation system may be configured to determine pre-handling time periods and post-handling time periods for multiple units processed in the materials handling facility (in some cases for all or most of the units processed in the materials handling facility).

In various embodiments, the actual labor expended on a given unit may be represented by the pre-handling time period or the post-handling time period. For instance, the time indicated by an item handling message may represent the time at which the unit was handled by the agent (e.g., the time the unit was scanned or identified by the agent). However, the labor expended on the unit may occur before or after such time. For instance, in a picking process where units are picked from bins in inventory storage, an agent may scan the unit prior to removing it from a bin, in which case the labor (e.g., picking) will occur after the time indicated by the item handling message. In other cases, the agent may scan the unit subsequent to removing it from the bin, in which case the labor (e.g., picking) occurs prior to the time indicated by item handling message. As described in more detail herein, the labor allocation system described herein may be configured to allocate labor to a particular unit by selecting either the pre-handling time or the post-handling time as being the labor expended on that unit. As described in more detail herein, the labor allocation system may utilize statistical analysis including variance analysis on units and associated pre- and post-handling time periods in order to perform the aforesaid labor allocation. The labor allocation data for units of the materials handling facility may be used to perform various business functions that rely on per-unit estimates of labor.

The Materials Handling Facility

FIG. 1 illustrates a logical representation or view of the operation of a materials handling facility 100 in which embodiments of the system and method for allocating labor to units processed in a materials handling facility may be implemented. In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, this Figure may illustrate an order fulfillment center of a product distributor, according to some embodiments. Multiple customers 10 may submit orders 20 to the product distributor, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10. In various embodiments, picked items may be delivered to a station where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system (e.g., control system 102). A picked, packed and shipped order does not necessarily include all of the items ordered by the customer; an outgoing shipment to a customer may include only a subset of the ordered items available to ship at one time from an inventory storage location.

A materials handling facility may also include a receiving 80 operation for receiving shipments of stock (e.g., units of inventory items) from one or more sources (e.g., vendors) and for moving or "stowing" the received stock into stock storage (e.g., inventory 30). The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities. In various instances, it should be understood that references to elements, units, items, processes (or anything else) as being located within materials handling facility 100 may easily be extended to encompass elements, units, items, processes (or anything else) proximate to but not physically located within materials handling facility. For example, various elements, units, items, or processes (or anything else) may be implemented outside of the materials handling facility, according to some embodiments.

As used herein, the term "item" may refer to a particular type of item and the term "unit" may refer to a particular instance of an item. For instance, an item might refer to a particular brand and model of a television, and multiple units of that same television might be stocked as inventory within a materials handling facility. As described in more detail below, in some embodiments, a given unit may actually include a collection of units, which may be a homogenous or a heterogeneous group of units. Furthermore, as used herein, the term agent may refer to a human agent or a machine agent (e.g., an automated or robotic agent) or any other agent for performing labor. In some cases, some agents, which may be referred to as managers or management entities, may supervise the actions of other agents or give instructions to such agents.

FIG. 1 illustrates various elements (e.g., elements 102-110) as being implemented within the materials handling facility. In some cases, some or all of these elements may operate remotely in another facility or location. In various embodiments, the same labor allocation system may allocate labor to units (according to the techniques described herein) for multiple different materials handling facilities. In other cases, multiple labor allocation systems (configured similar to labor allocation system 106) may monitor different materials handling facilities. For instance, each different materials handling facility may be monitored by a distinct labor allocation system. In such cases, each of such labor allocation systems may share information, such as labor metrics determined for various items.

Control System, Agent Systems and Item Handling Messages

Control system 102 may be configured to control some or all operations within materials handling facility 100. In some embodiments, control system 102 may also track the location of various units within the materials handling facility as well as the location of labor resources (e.g., agents) within the materials handling facility. Such information may be stored as a virtual (e.g., digital) model of the materials handling facility within one or more data stores, such as data store 108. In various embodiments, agent system(s) 104 and control system 102 may communicate through one or more networks, such as network 110. Network 110 may include one or more local area networks (LANs) (e.g., Ethernet), Wide Area Networks (WANs) (e.g., the Internet), wireless networks, some other network configured to communicate information or data electronically, or some combination thereof. Additionally, any of the data or information described herein may be stored in one or more data stores, such as data store(s) 108. In various embodiments, data store 108 may be configured as a database, as one or more mass storage devices (e.g., physical disks, logical volumes, etc.) configured to store data blocks or files, or in any other suitable configuration for data storage.

Figure 2:
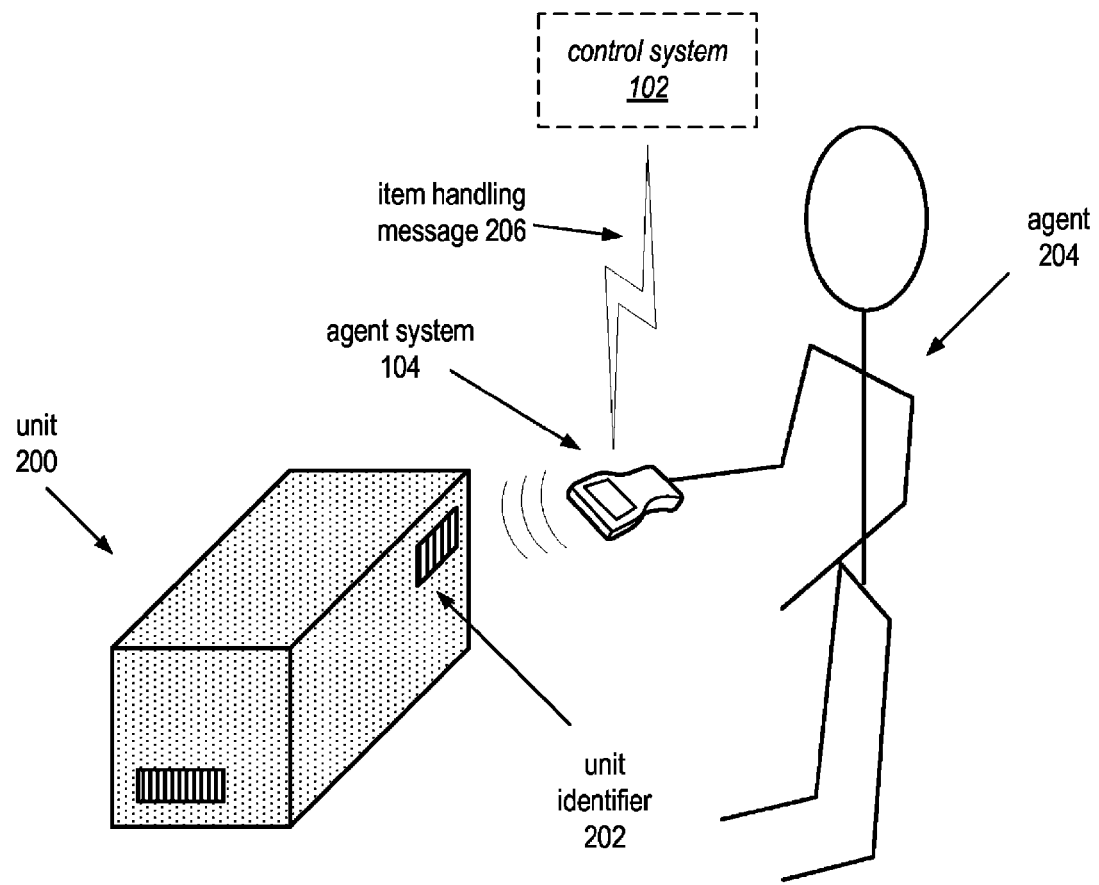
FIG. 2 illustrates the generation of an item handling message by an agent system, according to some embodiments.

Control system 102 may in various embodiments be configured to communicate with one or more agents system(s) 104. For instance, agents (or other labor resources) may have access to an agent system(s) 104, such as a mobile or handheld computer systems configured to receive and send messages (e.g., item handling messages) as well as electronically identify units within the materials handling facility. One example of an agent system 104 is illustrated in FIG. 2. In the illustrated embodiment, an agent 204 may operate agent system 104 to electronically identify unit 200. In the illustrated embodiment, unit 200 may include one or more unit identifiers 202, which may be electronically obtained by agent system 104 throughout various operations of the fulfillment center. Unit identifier 202 may represent any of a variety of identifiers including but not limited to barcodes (or other codes that may be read optically) and Radio Frequency Identifiers (RFID) tags. Agent system 104 may be configured to electronically obtain (e.g., scan or read) such identifiers. In other embodiments, other types of identifiers may be utilized, whether such identifiers are presently known or developed in the future; likewise, agent system 104 may be configured to electronically obtain such identifiers.

The scanning of unit 200 may represent an instance of an item handling or item touch. For instance, agent 204 may scan unit 200 prior to or subsequent to expending labor on the unit. For instance, as described above with respect to a picking process, a unit may be scanned prior to picking the unit or after picking the unit. Agent system 204 may be configured to generate an item handling message that indicates the unit identifier of the unit that was handled, the time at which the unit was handled, the agent that handled the unit and/or the materials handling process according to which the unit was processed. For instance, in an example where the illustrated embodiment represents a picking process where unit 200 is picked from inventory, the item handling message 206 may include unit identifier 202, a time at which unit 200 was handled (e.g., scanned), an identifier of agent 204 (or an identifier of agent system 104 associated with the agent), and an identifier for the picking process that distinguishes the picking process from other materials handling processes performed within the materials handling facility.

The generation of an item handling message 206 may be repeated multiple times for various instances of item handling within the materials handling facility and across different units, different agents (and associated agent systems), and different materials handling processes (examples of which are described below). In various embodiments, item messages may be aggregated in one or more data stores accessible to the elements of FIG. 1. For instance, item handling messages may be stored as handling data 107a of data store 108.

Materials Handling Processes of the Materials Handling Facility

In various embodiments, item handling messages may be generated during any of a variety of materials handling processes, examples of which are described in more detail below. In various embodiments, a materials handling process may include a receiving process for receiving a quantity of units into the materials handling facility. This process may also include recording the receipt of such units via an agent system, such as agent systems 104 described above. For instance, control system 102 may record the entrance of such items into the materials handling facility and updates a virtual inventory model in response to receiving corresponding item handling messages from agent systems 104. Another example of a materials handling process may include a re-drop process where multiple received items are consolidated at different drop locations proximate to inventory 30. Control system 102 may record the movement of such items to re-drop locations in response to receiving corresponding item handling messages from agent systems 104. Another example of a materials handling process may include a stow process for removing items from one or more locations (e.g., a receive dock or a re-drop location) and placing such items in assigned locations within inventory of the materials handling facility. Control system 102 may record the movement of such items to various inventory locations in response to receiving corresponding item handling messages from agent systems 104. Other examples of materials handling processes may include any process for completing the various operations illustrated in FIG. 1, including but not limited to processes for performing the picking, sorting, packing, or shipping of units. Control system 102 may record the processing of such units according to such materials handling processes in response to receiving corresponding item handling messages from agent systems 104 or from other systems, such as automated scanners within the materials handling facility (e.g., an optical scanner fixed over a conveyor belt). Note that various embodiments are not limited to the materials handling process described above. In general, any materials handling process that involves the movement, grouping, or alteration of units in the materials handling facility may be utilized in various embodiments, whether such materials handling processes are currently known or developed in the future.

Unit/Item Classifications

As described above, a given unit may be associated with a unit identifier 202, such as a barcode or RFID. In various embodiments, units of items may be associated with one or more unit classifications. In various embodiments, control system 102 and/or labor allocation system 106 may be configured to determine a base classification from the unit identifier of a unit. In some embodiments, a base classification may be the finest granularity classification within the fulfillment center. One example of a base classification may be a unique identifier for units of a particular item. In some cases, this unique identifier may be a stock keeping unit or "SKU." In various embodiments, control system 102 and/or labor allocation system 106 may be configured to evaluate mappings of unit identifiers (e.g., barcodes, RFIDs, etc.) to base classifications in order to determine the base classification for a particular unit. Such mappings may be stored in a data store, such as data store 108 described above. For instance, control system 102 and/or labor allocation system 106 may be configured to access a unit identifier from an item handling message and determine the corresponding base classification from the aforesaid mappings. In other cases, agent systems may include the base classification within item handling messages and the translation of a unit identifier to a base classification may be unnecessary. In various embodiments, the base classification may be the definitive identifier for units of a particular item within the materials handling facility (and possibly across multiple materials handling facility). In general, each unit processed by the materials handling facility may be associated with one base classification (although in some instances, some items may be associated with multiple base classifications). Likewise, in general, each base classification may be associated with one item.

In various embodiments, an item may also be associated with one or more physical classifications. In various embodiments, a physical classification of a particular unit may be a categorization of the unit based on one or more physical characteristics of that unit. The physical characteristics may include but are not limited to weight and/or dimensions (e.g., length, width, etc.). For example, a physical classification might indicate that an item is "small and light," "heavy and large," or some other physical characteristic or combination of physical characteristics. In some cases, a physical classification might indicate that that an item is fragile, oversized or otherwise unwieldy. In various embodiments, a given physical classification may be associated with multiple different items. For example, a "heavy and large" physical classification might include different types of televisions, desktop computers, monitors or other items determined to meet the requirements of that physical classification.

In various embodiments, items may have different physical classifications for different materials handling processes. In various embodiments, the particular physical classification utilized as well as the granularity of such physical classifications may be configurable (e.g., configurable by a human operator). In some cases, physical classifications may be combined to form new classifications. For instance, a unit may have a physical classification of "light" and another physical classification of "fragile." Such classifications may be combined to form a new physical classification "light and fragile." In various embodiments, mappings of base classifications to respective physical classifications may be stored in one or more data stores accessible to labor allocation system 106. In various embodiments, given a particular base classification, labor allocation system 106 may be configured to determine some or all of the corresponding physical classifications, such as by performing a lookup operation on the aforesaid mappings. In some embodiments, physical classifications may be identified by respective SKUs or other identifiers.

In various embodiments, a particular base classification may also be associated with one or more business classifications. In various embodiments, a business classification of a particular unit may be a categorization of the unit based on one or more business characteristics of that unit. The business characteristics may include but are not limited to the supplying vendor (e.g., the vendor that provided the unit to the materials handling facility), ownership status (e.g., the vendor that owns the unit), value (e.g., "high value" items), product condition (e.g., new, used, or refurbished), or some other business characteristic. In various embodiments, the particular business classification utilized as well as the granularity of such business classifications may be configurable (e.g., configurable by a human operator). In some cases, business classifications may be combined to form new classifications. For instance, a unit may have a business classification of "refurbished" and another physical classification of "high value." Such classifications may be combined to form a new business classification "high value refurbished unit." In various embodiments, mappings of base classifications to respective business classifications may be stored in one or more data stores accessible to labor allocation system 106. In various embodiments, given a particular base classification, labor allocation system 106 may be configured to determine some or all of the corresponding business classifications, such as by performing a lookup operation on the aforesaid mappings. In some embodiments, business classifications may be identified by respective SKUs or other identifiers. As described in more detail below, unit classifications may be modified over time to minimize variability of collected data.

In various embodiments, given a unit identifier (e.g., unit identifier 202) of a unit of a particular item, labor allocation system 106 may be configured to determine a corresponding base classification for that unit (e.g., by performing a lookup operation on mappings stored in data store 108 or elsewhere). Given the base classification, labor allocation system 106 may be configured to determine any physical classification or business classification associated with that item (e.g., by performing a lookup operation on mappings stored in data store 108 or elsewhere). Likewise, given a physical classification or business classification, labor allocation system 106 may be configured to determine multiple different base classifications associated with that physical or business classification (e.g., by performing a lookup operation on mappings stored in data store 108 or elsewhere). Any of the classifications described herein may be stored as item classifications 107*b* of data store 108 in various embodiments.

It should be understood that any reference to a classification associated with a particular item may also apply to units of that item. For example, one or more units of a particular item may each inherit the classification(s) assigned to that particular item.

Determining Pre- and Post-Handling Time Periods

Figure 3:
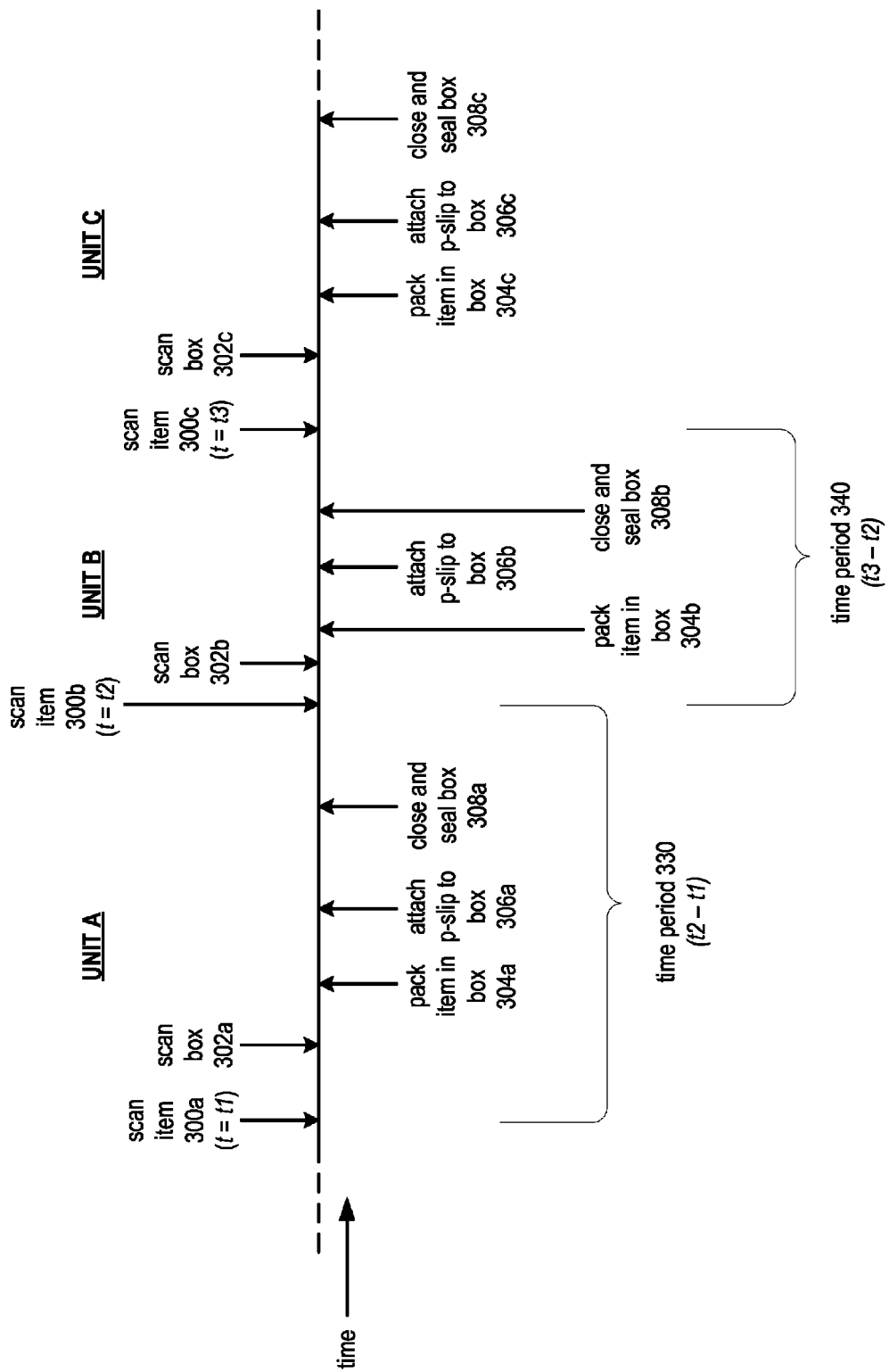
FIG. 3 illustrates an example timeline including multiple events for processing multiple units in accordance with a particular materials handling process, according to some embodiments.

In various embodiments, labor allocation system 106 described herein may be configured to determine a pre-handling time period and post-handling time period associated with the processing of a given unit of a sequence of units processed in accordance with a particular materials handling process. FIG. 3 illustrates a timeline of the processing of a sequence of 3 units (e.g., units A-C) in accordance with an example packing process. Note that the description presented herein may also apply to other types of materials handling processes; it should be understood that the illustrated packing process is only one example of multiple different processes to which the techniques presented herein may be applied. Note that in the illustrated embodiments, events to the left of the timeline occur before events further to the right of the timeline. For instance, the scan item 300*a* event occurs before the scan box 302*a* event. Also note that while the illustrated embodiment includes events for only three items, the techniques described herein may be applied to any quantity of items.

In the illustrated embodiment, an agent performing work at a packing station may scan an item (e.g., unit A) as illustrated by the event scan item 100*a*. For instance, an agent may scan the unit identifier (e.g., barcode or RFID) on a unit with an agent system 104. In response to such scan, the agent system may generate an item handling message, which may be accessible to labor allocation system 106. This item handling message may specify the unit identifier or the base classification determined for that unit (e.g., unit A), the time at which the unit was handled (e.g., scanned), the agent that performed the item handling, and/or the process by which the item was being processed (e.g., a packing process). An agent system 104 may provide such information to labor allocation system 106 directly or through one or more intermediary systems, such as control system 102, data store 108, or some other system. The agent may then scan the box as illustrated by event 302a. As illustrated by event 304a, the agent may then pack the item in the box with any appropriate dunnage (e.g., protective packing materials, such as bubble wrap). As illustrated by event 306a, the agent may then apply a packing slip to the box (or insert the packing slip within the box). As illustrated by event 308a, the agent may then close and seal the box for shipping. Subsequent to completing the processing of unit A, the agent may process unit B in a similar fashion, as illustrated by events 300b-308b. Additionally, subsequent to processing unit B, the agent may process unit C in a similar fashion as well, as illustrated by events 300c-308c. Note that the events 302b and 302c ("scan box") may result in additional item handling messages that are similar to the item handling message generated in response to event 302a as described above. In various embodiments, the item handling messages may be aggregated in data store 108 or another location accessible to labor allocation system 106.

The item handling message generated in response to event 300a may specify the time t1 as the time at which unit A was processed (irrespective of whether the agent expended labor on the unit before or after the scanning of the unit at time t1). Likewise the item handling messages generated in response to events 300b and 300c may specify times t2 and t3 as the times at which unit B and unit C were processed, respectively. Labor allocation system 106 may perform one or more operations based on information of the aforesaid item handling messages in order to determine a pre-handling time period and post-handling time period for each unit, as described in more detail below.

For each of the illustrated units, labor allocation system 106 may be configured to determine a pre-handling time period and a post-handling time period. This process is described with respect to unit B below. However, the techniques described herein may apply to any other unit. To determine the pre-handling time period for unit B, labor allocation system 106 may be configured to determine the period of time between the time indicated by the item handling message for unit B and the time indicated by the item handling message for the previous unit in the sequence (e.g., unit A). The pre-handling time period for unit B may be determined to be time period 330, which may be equal to t2−t1 in the illustrated embodiment. To determine the post-handling time period for unit B, labor allocation system 106 may be configured to determine the period of time between the time indicated by the item handling message for unit B and the time indicated by the item handling message for the subsequent unit in the sequence (e.g., unit C). The post-handling time for unit B may be equal to time period 340, which may be equal to t3−t2 in the illustrated embodiment.

Without performing any additional analysis, it may in some cases not be possible to determine whether the labor expended on unit B is more accurately represented by time period 330 or by time period 340. As described in more detail herein, for a given unit, labor allocation system 106 may be configured to determine whether the pre-handling time period or the post-handling time period is representative of the quantity of labor (e.g., labor in man-hours or some other unit of labor) expended on processing the given unit in accordance with the respective materials handling process.

In various embodiments, labor allocation system 106 may be configured to perform one or more statistical analyses (including variance-based analyses) on pre- and post-handling time periods in order to determine which of such periods should be utilized to represent the labor expended on units processed according to the particular materials handling process. In various embodiments, such analyses may be confined to units of a particular classification (e.g., a particular physical classification or particular base classification) and/or to units processed by agents of a common proficiency classification (described in more detail below). In various embodiments, such analyses may be repeated for different materials handling processes within the materials handling facility and/or for different classifications of units processed by a particular materials handling process.

Attributing Labor to Pre- or Post Handling Time Periods

In various embodiments, labor allocation system 106 may aggregate the above-described data (e.g., pre- and post-handling time periods) for a group of units processed according to a particular materials handling process; labor allocation system may be configured to perform the labor allocation techniques described herein on such aggregated data. In various embodiments, such group of units may be limited to units of the same physical classification. As described above, units may be associated with different physical classifications, such as "light and small," "heavy and large," or some other physical classification in accordance with the physical classifications described above. In some embodiments, such group of units may be limited to a base classification, such as units of the same type of item. Limiting the scope of data in this way may facilitate the variance analysis described in more detail below because agents (particularly those within the same proficiency class) may in some cases expend labor in a uniform or near uniform way across units having the same physical characteristics (e.g., units of the same physical classification, or units of the same base classification) for a given materials handling process. For example, agents may in some cases have a propensity to expend labor on all "light and small" units in the same way for a given process (e.g., expending labor either pre- or post-handling).

For a given classification of units and a given materials handling process, labor allocation system 106 may be configured to determine whether the labor expended on processing such classification of units is represented by the pre-handling time periods associated with such units (e.g., time period 330 for unit B described above) or by the post-handling time periods associated with such units (e.g., time period 340 for unit B described above).

In various embodiments, labor allocation system 106 may be configured to aggregate two data sets, one data set including pre-handling processing time periods for units of the given classification of units and another data set including post-handling processing times for units of the given classification of units. For instance, labor allocation system 106 may be configured to access such data sets from data store 108 or some other data store.

Labor allocation system 106 may be configured to perform a statistical analysis on each of such data sets to determine respective measures of variability. As described herein, determining a measure of variability is largely described as determining a measure of variance for a given data set. It should be noted that in various embodiments, other techniques for determining measures of variability of a set of time periods (e.g., either pre- or post-handling time periods) may be utilized by labor allocation system 106 including but not limited to determining a range of such time periods (e.g., difference between highest data value and lowest data value), determining an interquartile range or "IQR" of such time periods (e.g., range of middle 50% of data values or the difference between the 75$^{th}$ percentile value and the 25$^{th}$ percentile value), determining a standard deviation of such time periods, and/or determining any other statistical measure of variability of a data set of time periods.

As described above, the variability of each data set of time periods (pre- or post-handling) may be generated according to a variety of statistical analyses or methods. In one example, performing a statistical analysis to determine a measure of variability may include performing a statistical analysis to determine the variance of a data set of pre- or post-handling time periods according to equation 1.

$$\sigma^2 = \frac{\sum_{i=1}^{n} x_i^2 - \frac{\left(\sum_{i=1}^{n} x_i\right)^2}{n}}{n} \quad (1)$$

In equation 1, $\sigma^2$ may represent the variance of a population of n data points for pre- or post-handling time periods. In other embodiments, variance may be calculated based on a finite sample of pre- or post-processing time periods (e.g., when data sets are so large that analyzing each data point of the population becomes computationally prohibitive). In various embodiments, labor allocation system 106 may be configured to determine multiple values of variability for a particular materials handling process. For instance, a post-handling measure of variability may be determined based on a data set including post-handling time periods. Additionally, a pre-handling measure of variability may be determined based on a data set including pre-handling time periods. For example, in the variance analysis described above, the labor allocation system may be configured to determine first measure of variability as being the $\sigma^2$ value determined for the data set including pre-handling time periods as well as determine a second measure of variability as being the $\sigma^2$ value determined for the data set including post-handling time periods.

As described above, the data sets of pre- and post-handling time periods utilized to determine the above-described variability values may be limited to units of the same classification (e.g., physical classification or base classification). In some cases, such data sets may also be limited by the labor allocation system to units processed by agents of a same proficiency class. For instance, in various embodiments, agents may be assigned to different proficiency classes based on historical performance data; the proficiency class for each agent may in various embodiments be indicated by information of data store 108. In one example, each agent's historical performance is measured in units processed per hour (UPH); such information ma also be stored in a data store 108 or some other data store accessible to the labor allocation system. Agents may be grouped by the labor allocation system into different proficiency classes based on different ranges of performance. In one example, one proficiency class may be populated by agents that have historical performance falling within the range of 5-15 UPH, and another proficiency class may be populated by agents that have historical performance falling within the range of 15-30 UPH. Note that these ranges are merely examples; other ranges may be used in various embodiments.

In various embodiments, labor allocation system 106 may be configured to compare the measure of variability determined for the pre-handling time periods to the measure of variability determined for the post-handling time periods. In response to determining that the measure of variability of the pre-handling time periods is less than the measure of variability of the post-handling time periods, labor allocation system 106 may be configured to determine that the pre-handling time periods are representative of the labor expended on processing the respective units of the classification. In the context of FIG. 3, an example of such a determination would include determining that time period 330 is representative of the labor expended on processing unit B, that time period 340 is representative of the labor expended on processing unit C, and so on for each unit of the sequence. Alternatively, in response to determining that the measure of variability of the pre-handling time periods is not less than the measure of variability of the post-handling time periods, labor allocation system 106 may be configured to determine that the post-handling time periods are representative of the labor expended on processing the respective units of the classification. In the context of FIG. 3, an example of such a determination would include determining that time period 330 is representative of the labor expended on processing unit A, that time period 340 is representative of the labor expended on processing unit B, and so on for each unit of the sequence.

As described above, in some embodiments, a given unit may actually include a collection of multiple units. For example, in some fulfillment processes, an agent may handle a collection of multiple units at the same time. For instance, in a stowing process, an agent may stow a case of multiple units in a single stow. Such case may be treated as a single unit for purposes of collecting an item handling message in various embodiments. Utilizing the techniques described herein, the labor allocation system may determine the quantity of labor associated with the collection of units. Based on this quantity of labor, the labor allocation system may determine quantities of labor for the individual units of that collection of units. For example, the labor allocation system may equally divide the quantity of labor among each of such units. In some cases, such an approach may be utilized for a homogenous collection of units.

In another example, the quantity of labor of the collection of units may be divided among such units based on labor allocation information collected for other materials handling facilities. For instance, for each unit of the collection of units, labor allocation system 106 may be configured to determine a labor metric based on operations of one or more other materials handling facilities. From these labor metrics, the labor allocation system may determine different proportions or ratios according to which the quantity of labor for the collection of units should be divided. In an example of a collection of three units, one-tenth of the labor might be allocated to one unit, two-fifths of the labor might be allocated to another unit, and the remaining half of the labor might be allocated to the last unit. In some cases, such an approach may be utilized for a heterogeneous collection of units.

Figure 4:
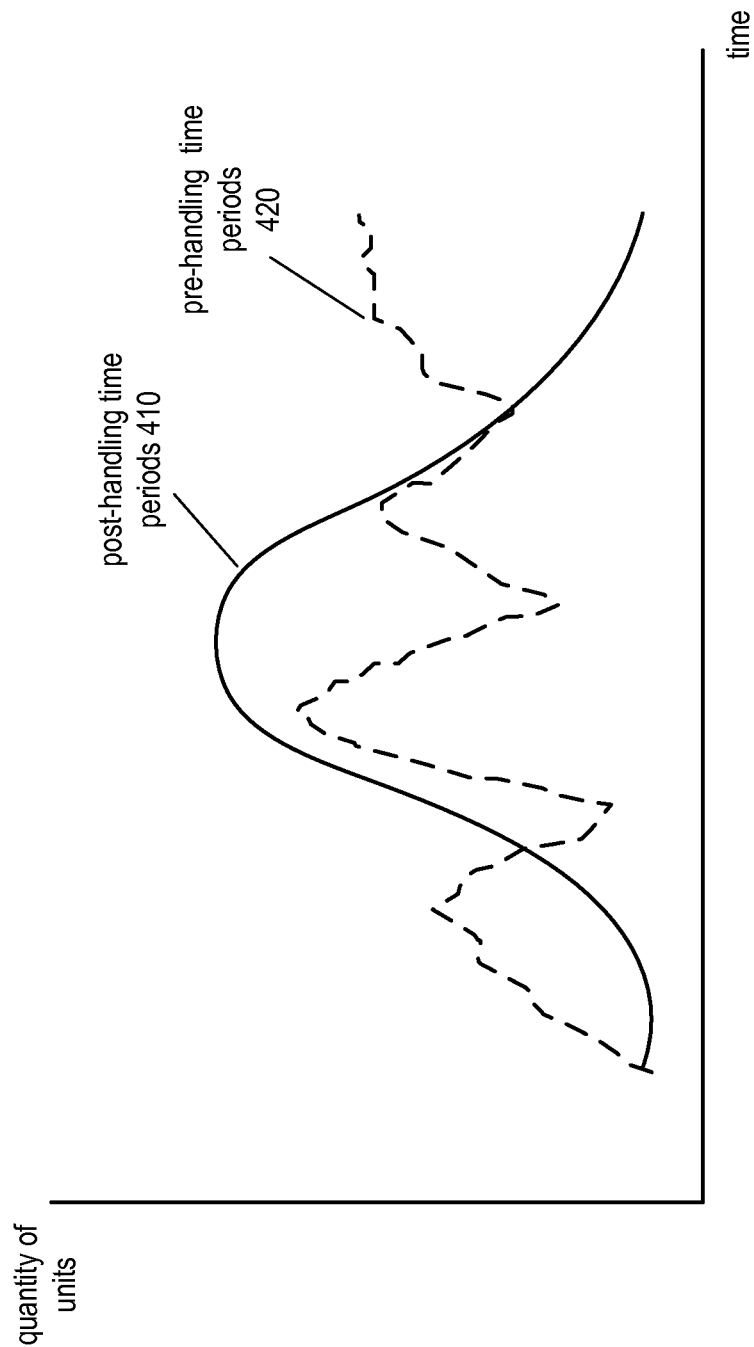
FIG. 4 illustrates a graphical representation of multiple distributions of data for comparing variability of data sets, according to some embodiments.

FIG. 4 illustrates a graphical representation of two example distributions of the data sets described above. Distribution 410 illustrates a distribution of the post-handling time periods and distribution 420 illustrates a distribution of the pre-handling time periods. As is readily apparent by comparing the two distributions of this example, distribution 410 (post-handling time periods) has a measure of variability that is less than that of distribution 420 (pre-handling time periods). In this particular example, labor allocation system 106 may determine that the labor expended on processing the units of the classification being evaluated is represented by the post-handling time periods.

In some embodiments, for a materials handling process, a given classification of units, and/or a given proficiency class of agents, the labor allocation system may be configured to assign an operation status to that materials handling process. For instance, a pre-handling operation status may be assigned to the materials handling process in response to determining that the measure of variability of the pre-handling time periods is less than the measure of variability of the post-handling time periods. Alternatively, a post-handling operation status may be assigned to the materials handling process in response to determining that the measure of variability of the pre-handling time periods is not less than the measure of variance of the post-handling time periods. In various embodiments, such operation statuses may be stored in data store 108 or some other data store accessible to the labor allocation system. In various embodiments, such operation statuses may be utilized to monitor agent performance and/or modify operating procedures (e.g., SOPs), such as described in more detail with respect to the method of FIG. 6B.

Figure 5A:
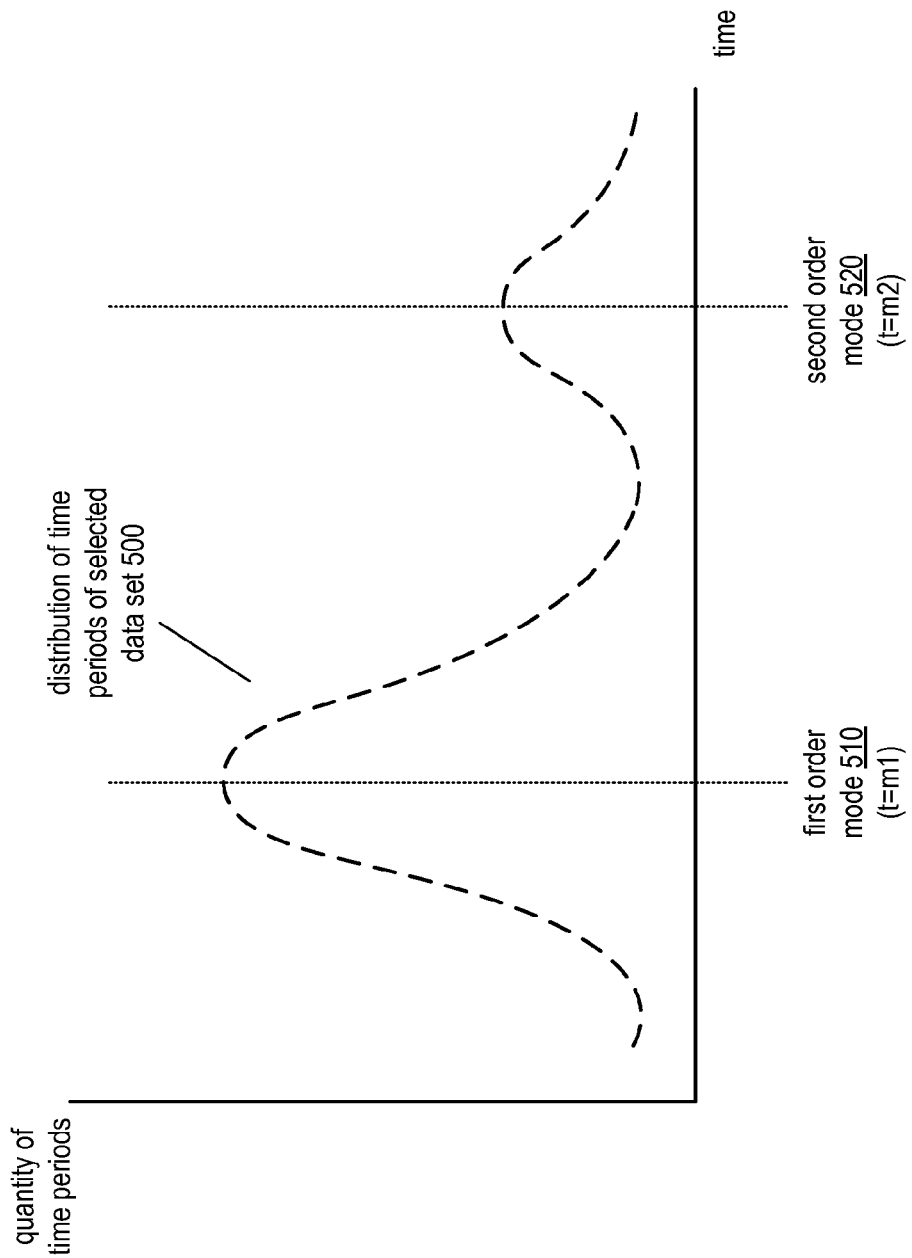
FIGS. 5A-B illustrate graphical representations of distributions of data for a mode-based statistical analysis, according to some embodiments.
Figure 5B:
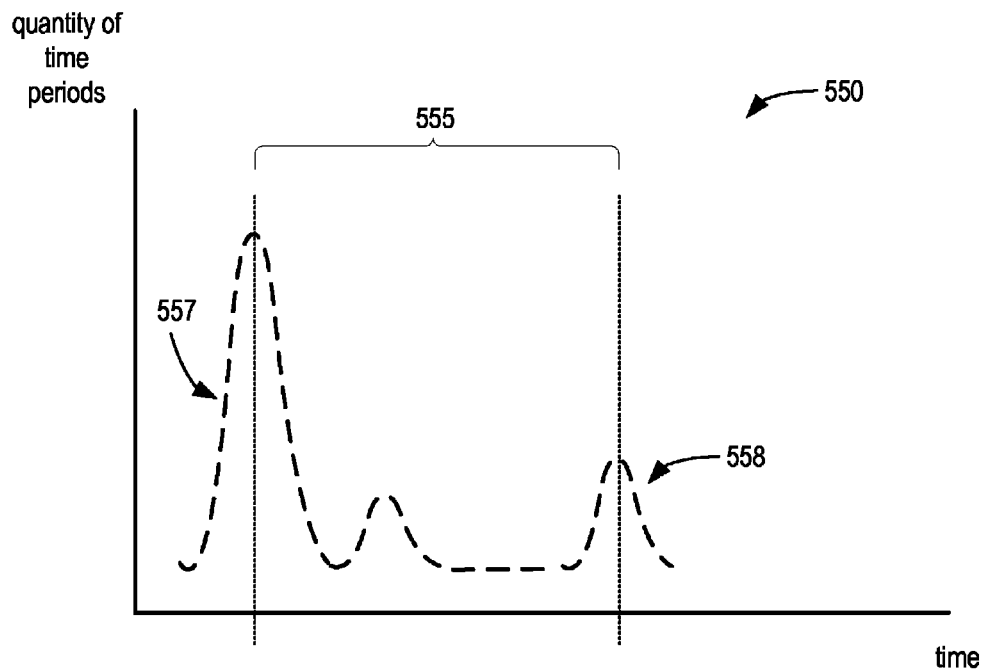
Figure 5B:
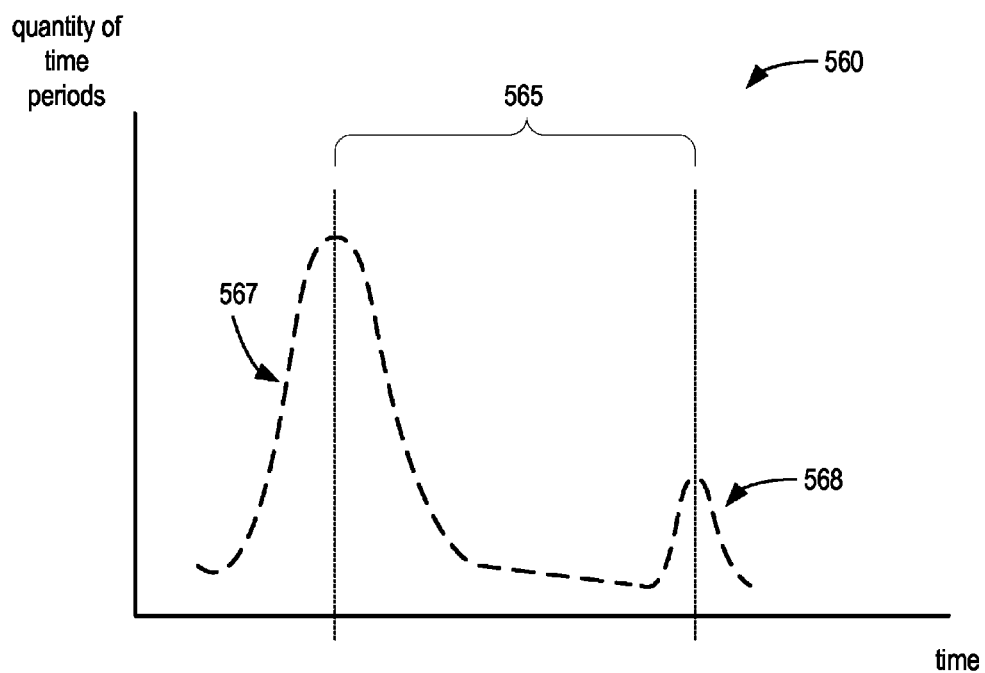

In various embodiments, whichever data set (either pre- or post-handling time periods) is determined to have the lesser measure of variability may be utilized to generate one or more labor metrics, such as labor metrics 107c stored in data store 108 (or some other data store accessible to labor allocation system 106). For clarity, the data set having the lower measure of variability may be referred to herein as the "selected" data set. Depending on the measures of variability determined by the labor allocation system, the selected data set may be comprised of the pre-handling time periods or comprised of the post-handling time periods. In various embodiments, labor allocation system 106 may generate a variety of different labor metrics based on the selected data set, such as described in more detail below with respect to FIGS. 5A-5B.
Decomposing Pre- and Post-Handling Time Periods In various embodiments, each time period described above (e.g., pre- and post-time periods) may include processing time and one or more portions of preparation or setup time. In various embodiments, preparation time may include time spent doing work to facilitate the processing of a batch of units whereas processing time may include time spent actually processing a unit. Such processing time may be referred to herein as unit-specific processing time (e.g., processing time representative of labor expended on processing a unit). In various embodiments, preparation time may be dependant or independent of the corresponding unit being processed.

In some embodiments, a unit-independent preparation time may include time spent doing work to facilitate the processing of units without actually performing work on those units. For instance, when an agent travels to a container of multiple units in order to process such units in accordance with a materials handling process, the travel time to reach that container may be considered unit-independent preparation time. In another example, replenishing depleted packing materials at a packing station may be considered to be unit-independent preparation time because such packing materials will need to be replenished irrespective of the subsequent units that are processed at that packing station.

In various embodiments, a unit-dependent preparation time may include time spent doing work to facilitate the processing of a group of units. For instance, in some cases, additional adhesive labels (e.g., adhesive labels including barcodes) may need to be applied to a group of units from a third party supplier. The preparation time associated with preparing such stickers may be unit-dependent preparation time because units of other vendors may not require such adhesive labels.

To identify unit-specific processing times, unit-independent preparation times, and/or unit-dependent preparation times, labor allocation system 106 may be configured to perform a statistical analysis of the frequency distribution of the time periods of the selected data set (e.g., the data set determined to have the lesser measure of variability, as described above). An example of a distribution of the time periods of the selected data set is illustrated by distribution 500 of FIG. 5A. In various embodiments, the labor allocation system described herein may be configured to perform a statistical analysis on the data of the distribution in order to determine one or more statistical modes of the data, such as modes 510-520 of FIG. 5A. For instance, the time periods of the selected data set may be distributed across uniform or non-uniform intervals (e.g., an interval of time, such as one minute, or some other time interval). In various embodiments, intervals representing local maxima of time periods may represent a mode. In the illustrated embodiment, the first order mode 510 and the second order mode 520 are representative of modes that may be identified according to such techniques.

In various embodiments, the labor allocation system may be configured to determine a first order mode, which may be a mode accounting for the largest quantity of time periods in the distribution. Such mode is illustrated as first order mode 510 of FIG. 5A. In various embodiments, such mode may be representative of the unit-specific processing time for units of the physical classification corresponding to that distribution. Labor allocation system 106 may be configured to determine the unit-specific processing time based on the time periods (of the selected data set) corresponding to the first order mode. For instance, labor allocation system 106 may be configured to determine the unit-specific processing time as being the mean of such time periods (denoted as m1 in FIG. 5A).

In various embodiments, the labor allocation system may be configured to determine a second order mode, which may be any mode other than the first order mode. Such mode is illustrated as second order mode 520 of FIG. 5A. In various embodiments, such mode may be indicative of the unit-dependent preparation time for units of the physical classification corresponding to that distribution. Labor allocation system 106 may be configured to determine the unit-dependent preparation time based on the time periods (of the selected data set) that correspond to the second order mode. For instance, labor allocation system 106 may be configured to determine the unit-dependent preparation time as being the mean of such time periods (denoted as m2 in FIG. 5A).

In various embodiments, to determine the unit-independent preparation time, labor allocation system may be configured to generate multiple distributions for the same materials handling process, each distribution corresponding to a different classification of units. Examples of such distributions are illustrated as distributions 550 and 560 of FIG. 5B. In various embodiments, since unit-independent preparation time may not be correlated with units of any particular classification, it may create an $N^{th}$ order mode that may be located at a fixed distance away from the first order mode of each of such distributions. In the illustrated embodiment of FIG. 5B, distribution 550 may have an $N^{th}$ order mode 558 located a distance 555 (which may be a specific length of time) away from the first order mode 557. Likewise, distribution 560 may have an $N^{th}$ order mode 568 located a distance 565 (which may be a specific length of time) away from the first order mode 567. The labor allocation system may be configured to identify each $N^{th}$ order mode by determining that distances 555 and 565 are the same (or similar to a requisite degree). In response to such a determination, the labor allocation component may be configured to determine that distances 555 and 565 (or some variation thereof, such as the mean of such distances) are representative of unit-independent preparation time for the given materials handling process. While the aforesaid techniques are described with respect to two distributions, it should be understood that such techniques may also be applied to three or more distributions.

In some cases, such as when unit-dependent labor is expended more frequently for a given physical classification and a given materials handling process, the first and second order modes described above (e.g., FIG. 5A) may be nearly indistinguishable. In such cases, the labor allocation system described herein may be configured to determine an estimated quantity of unit-specific processing time and unit-dependent preparation time by utilizing different techniques than those described above. To do so, the labor allocation system may be configured to designate a certain item or group of items as being a standard for a given physical classification. Based on operating procedures for the respective materials handling processes, the labor allocation system may perform a measurement of the item-specific processing time and item-dependent preparation time for a sample time period (such process may be repeated periodically or aperiodically) (such measurements may also be performed manually by an agent in some cases). Based on such information, the labor allocation system may in various embodiments perform a determination of a ratio of item-dependent preparation time to item-specific processing time. In various embodiments, the labor allocation system described herein may be configured to utilize such ratio to distinguish between item-dependent preparation time and item-specific processing time of non-standard units.

In various embodiments, any of the unit-specific processing times, unit-dependent preparation times, and unit-independent preparation times may be stored as labor metrics, such as labor metrics 107c of data store 108, described above.

Example Methods

Figure 6A:
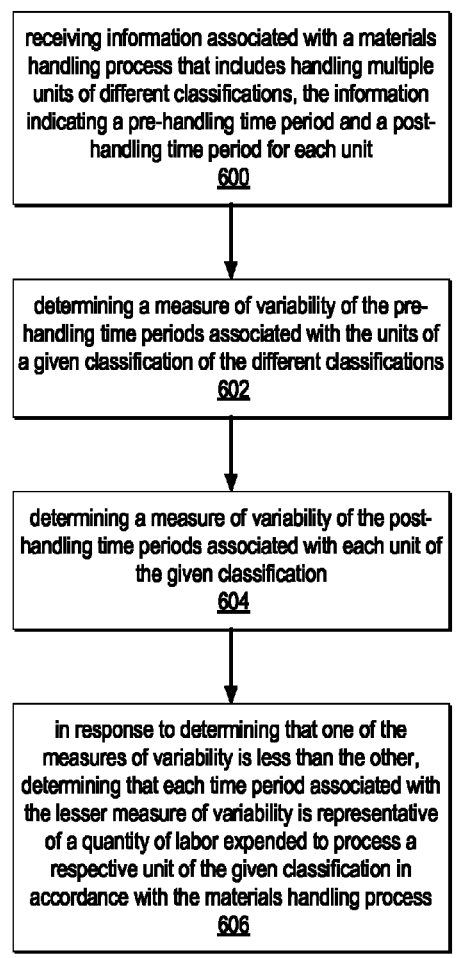

Various methods may be performed according to the system and method for allocating labor to units processed in a materials handling facility. FIGS. 6A-6B illustrate flowcharts of examples of such methods. In various embodiments, the methods of FIGS. 6A-6B may be performed by the labor allocation system described herein.

As illustrated by block 600, the method may include receiving information associated with a materials handling process that includes handling multiple units. In various embodiments, such information may indicate a pre-handling time period and post-handling time period for each given unit of the multiple units. As described above with respect to previous Figures, a pre-handling time period may in various embodiments indicate a period of time between the handling of the given unit and the handling of a previously-handled unit. As described above, units may be processed in sequences when a materials handling process is performed. In various embodiments, the previously-handled unit may be the unit that directly precedes the given unit in one of such sequences. Also described above, a post-handling time period may include a period of time between the handling of the given unit and the handling of a subsequently-handled unit. In various embodiments, the subsequently-handled unit may be the unit that directly precedes the given unit in a sequence of units processed according to the materials handling process. In various embodiments, the units for which the information is received may include includes units of different classifications, such as different physical classification or different base classifications, as described above. In various embodiments, receiving the aforesaid information may include receiving handling data (which may include item handling messages that collectively specify the pre-handling time periods and post-handling time periods described above). An example of such handling data is illustrated as handling data 107a, which is described above.

As illustrated by block 602 and 604, the method may also include determining a measure of variability of the pre-handling time periods associated with the units of a given classification of the different classifications as well as determining a measure of variability of the post-handling time periods associated with each unit of the given classification. In various embodiments, determining the aforesaid measures of variability may include any of the techniques described above including but not limited to determining variance (e.g., as described above with respect to equation 1) of the time periods, determining range of the time periods, determining IQR of the time periods, determining standard deviation of the time periods, or performing another type of statistical analysis to generate a measure of variability of the time periods.

As illustrated by block 606, the method may also include determining that one of the measures of variability is less than the other. In response to that determination, the method may include determining that each time period associated with the lesser measure of variability is representative of a quantity of labor expended to process a respective unit of the given classification in accordance with the materials handling process. For instance, if it is determined that the data set including the pre-handling time periods has a lower variability, the method may include determining that each time period of the pre-handling time periods is representative of a quantity of labor expended to process a respective unit of the given classification. In another example, if it is determined that the data set including the post-handling time periods has a lower variability, the method may include determining that each time period of the post-handling time periods is representative of a quantity of labor expended to process a respective unit of the given classification.

In various embodiments, the method may also include determining a common quantity of labor for the units of the given classification. For instance the common quantity of labor may be determined based on each time period associated with the lesser measure of variability. In one example, the common quantity of labor may be determined to be the mean of such time periods. In various embodiments, this quantity of labor may be stored as a labor metric for the given classification, such as described above with respect to labor metrics 107c. For instance, if the given classification is a base classification, the method may include storing a record that maps the base classification to that quantity of labor. If the given classification is a physical classification, the method may include storing a record that maps the physical classification to that quantity of labor. In various embodiments, base classifications associated with physical classification may inherit the labor metrics of that physical classification. For example, units of the given classification may be units of different base classifications (different items, or some other type of base classification). In such cases, the method may include, for each base classification, assigning the common quantity of labor to that base classification. In various embodiments, this assignment may include creating a labor metric for that base classification; such labor metric may indicate an estimate of the quantity of labor required to process an additional unit of that base classification in accordance with the materials handling process. In various embodiments, any of such labor metrics may be stored as part of labor metrics 107c of data store 108.

In various embodiments, the method may also include assigning labor metrics to a business classification. Business classifications may include a group of base classifications categorized based on one or more business characteristics of that base classification. The business characteristics may include but are not limited to the supplying vendor (e.g., the vendor that provided the unit to the materials handling facility), ownership status (e.g., the vendor that owns the unit), value (e.g., "high value" items), product condition (e.g., new, used, or refurbished), or some other business characteristic. In various embodiments, the method may include generating one or more reports that include any of the business classifications described herein. For example, such reports may indicate the quantity of labor associated with processing units of different vendors or the quantity of labor required to process used units relative to processing new units. In general, such reports may include any combination of labor metrics associated with business characteristics. In various embodiments, such reports may be stored in a data store, such as data store 108, or made accessible to one agents, such as management entities.

FIG. 6B illustrated a method for generating recommendations based on agent performance, according to some embodiments. In various embodiments, the illustrated method may be performed by labor allocation system 106 described above. In some embodiments, the method of FIG. 6B may begin subsequent to block 606 of FIG. 6A.

As illustrated by block 610, the method may include assigning an operation status to a materials handling process, such as the materials handling process described above with respect to FIG. 6A. For instance, the method may include assigning a pre-handling operation status to the materials handling process in response to determining that the measure of variability of the pre-handling time periods is less than the measure of variability of the post-handling time periods. Alternatively, the method may include assigning a post-handling operation status to the materials handling process in response to determining that the measure of variability of the pre-handling time periods is not less than the measure of variability of the post-handling time periods. In various embodiments, the method may include storing such operation statuses in a data store, such as data store 108. In various embodiments, the operation status may indicate whether labor for the materials handling process is expended before or after the handling of items. For instance, if the lesser measure of variability is associated with the pre-handling time periods, the operation status may indicate that labor for the materials handling process is expended before the handling of units. In another example, if the lesser measure of variability is associated with the post-handling time periods, the operation status may indicate that labor for the materials handling process is expended after the handling of units.

As illustrated by block 612, the method may include periodically (or aperiodically) evaluating agent performance with respect to the operation status for that materials handling process. For instance, in various embodiments, the method may include determining the quantities of agents that expend labor in accordance with the operation status of that materials handling process. In one example, the method may include determining the determining the quantity of agents that expend labor pre-handling (e.g., prior to item handling) and the percentage of agents that expend labor post-handling (e.g., subsequent to item handling). In various embodiments, the method may also include determining the performance of the agents. For instance, the method may include determining agent performance measured in UPH or some other metric, as described above.

As illustrated by block 614, the method may include generating one or more recommendations based on the evaluation of agent performance. For instance, if a subset of agents do not perform work in accordance with the operation status and the performance of such agents (as indicated by a performance metric, such as UPH) is less than that of agents that perform work in accordance with the operation status, the method may include generating a recommendation to retrain the agents that are not performing work in accordance with the operation status. In another example, if a subset of agent do not perform work in accordance with the operation status of the materials handling facility and the performance of such agents (as indicated by a performance metric, such as UPH) is greater than that of agents that perform work in accordance with the operation status, the method may include generating a recommendation to reevaluate or modify the operation status and/or an operation procedure for that materials handling process (e.g., an SOP, described above).

In various embodiments, the interval(s) at which the evaluations of block 612 are performed may be dependent on the volume of units processed by the materials handling facility. For instance, if the volume of units processed increases over time, the method may include shortening such interval(s) to prevent the system from adapting slowly to changes in agent behavior. Likewise, if the volume of units processed decreases over time, the method may include lengthening such intervals to ensure that a statistically significant sample of agent behavior is being evaluated.

Example Computer System

Various embodiments of a system and method for allocating labor to units processed in a materials handling facility, as described herein, may be executed on one or more computer systems, which may interact with various other devices. Note that any component, action, or functionality described above with respect to FIGS. 1-6B may be implemented via one or more computer systems configured as computer system 900 of FIG. 7, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 implementing labor allocation system 106 (configured as described above) and data store 108 (as described above) are shown stored within system memory 920. Additionally, data 932 of memory 920 may store any of the data structures described above, in some embodiments. In some embodiments, program instructions and/or data may be received, sent or stored upon different types of computer-accessible media or on similar media separate from system memory 920 or computer system 900. While computer system 900 is illustrated as implementing the functionality of labor allocation system 106, any of the components illustrated above with respect to FIG. 1, (e.g., the control system, agent systems, etc.) may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices (e.g., any other component of FIG. 1, as described above) attached to a network 985 (which may be similar to or the same as network 110 described above) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Figure 7:
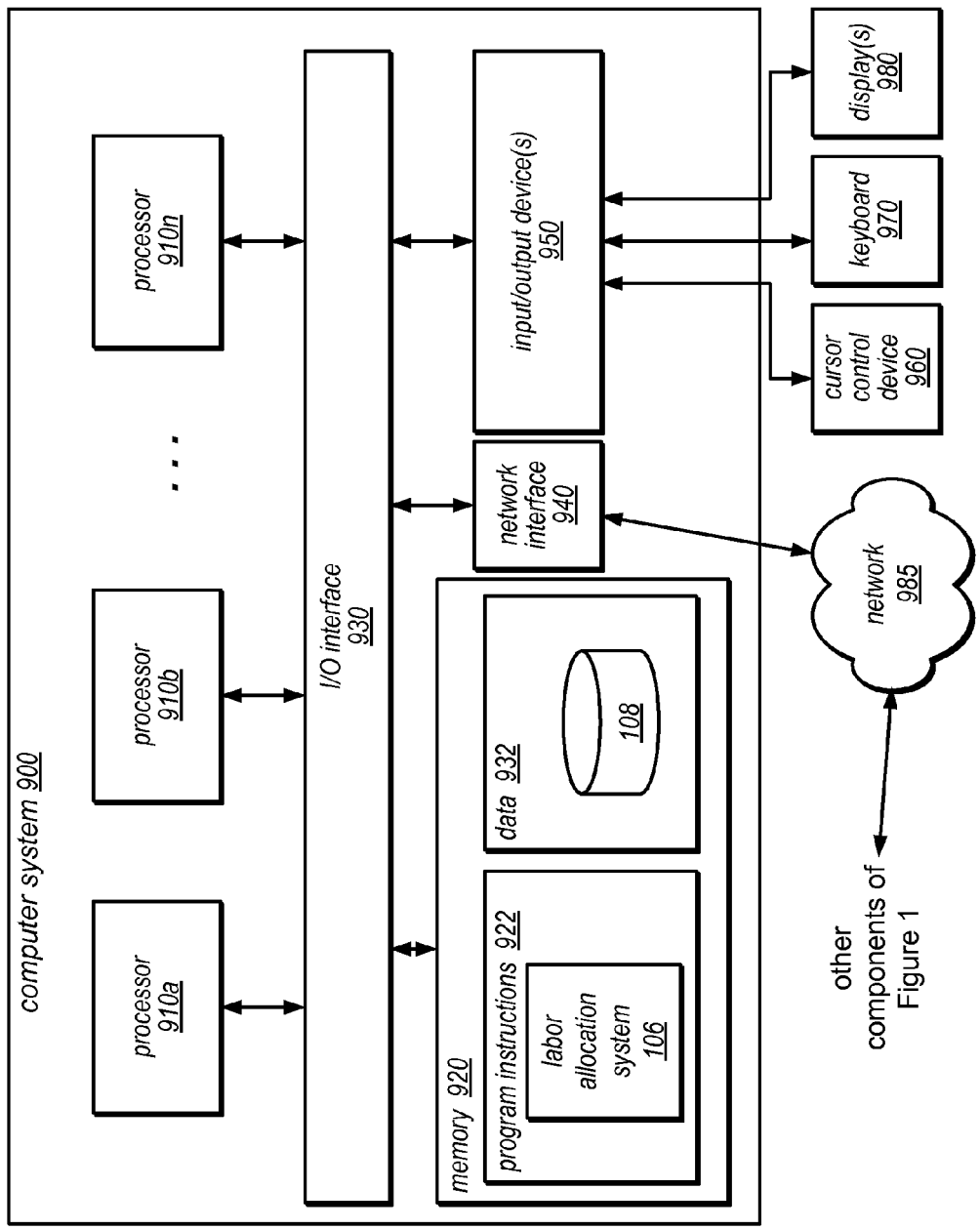
FIG. 7 illustrates one example of a computer system suitable for implementing various elements of the system and method for allocating labor to units processed in a materials handling facility, according to some embodiments.

As shown in FIG. 7, memory 920 may include program instructions 922 configured to implement any element or action described above, such as the functionality of labor allocation system 106. In one embodiment, the program instructions may implement the methods described above, such as the method illustrated by FIG. 6. In other embodiments, different elements and data may be included. Note that data 932 may include any data described above with respect to FIGS. 1-6B.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:
   receiving information associated with a materials handling process that includes handling a plurality of units, wherein the information indicates, for each unit of said plurality of units:
      a respective pre-handling time period indicating a period of time between a handling message time for that unit and a handling message time for a previously-handled unit, wherein said pre-handling time period represents a labor expenditure for either the unit or the previously-handled unit; and
      a respective post-handling time period indicating a period of time between a handling message time for that unit and a handling message time for a subsequently-handled unit, wherein said post-handling time period represents a labor expenditure for either the unit or the subsequently-handled unit;
   wherein said plurality of units includes units of different classifications;
   determining a measure of variability of the pre-handling time periods associated with the units of a given classification of said different classifications;
   determining a measure of variability of the post-handling time periods associated with each unit of the given classification;
   determining, by one or more computing devices, that either the measure of variability of the pre-handling time periods or the measure of variability of the post-handling time periods is less than the other; and
   based on said determining, indicating, by one or more computing devices, either that the pre-handling time periods or that the post-handling time periods, associated with the lesser measure of variability, are representative of quantities of labor expended to process the units of said given classification in accordance with the materials handling process.

2. The method of claim 1, further comprising:
   determining a common quantity of labor for the units of the given classification, wherein the common quantity of labor is determined based on each time period associated with the lesser measure of variability.

3. The method of claim 2, wherein said common quantity of labor is the mean of the respective time periods associated with the lesser measure of variability.

4. The method of claim 2, wherein the units of the given classification are units of different base classifications, wherein the method comprises:
   for each base classification of the different base classifications, assigning said common quantity of labor to that base classification, wherein the common quantity of labor indicates an estimate of the quantity of labor required to process an additional unit of that base classification in accordance with the materials handling process.

5. The method of claim 1, wherein said different classifications are classifications based on physical characteristics of units including characteristics based on one or more of: a weight of a unit or a physical dimension of a unit.

6. The method of claim 1, wherein the received information associated with the materials handling process comprises information collected as part of a normal mode of operation of that materials handling process such that receipt of the information associated with the materials handling process does not introduce additional processing overhead to the materials handling process.

7. The method of claim 1, further comprising, for one or more additional classifications of said different classifications, repeating said determining a measure of variability of the pre-handling time periods, said determining a measure of variability of the post-handling time periods, and said determining that each time period associated with the lesser measure of variability is representative of a quantity of labor.

8. The method of claim 1, further comprising:
   determining a first plurality of modes of a first frequency distribution for the materials handling process, wherein the first frequency distribution is a distribution of each time period associated with the lesser measure of variability;
   determining a processing time associated with units of said classification, wherein said processing time is determined based on a subset of the time periods associated with the lesser measure of variability, wherein said subset of time periods corresponds to a first mode of said first plurality of modes, wherein the first mode is determined to include a largest quantity of the time periods associated with the lesser measure of variability relative to the other modes of said first plurality of modes.

9. The method of claim 8, further comprising:
   determining a classification-dependent setup time associated with preparing units of said given classification to be processed in accordance with the materials handling process, wherein the classification-dependent setup time is determined based on a subset of the respective time periods that corresponds to a different mode of the first plurality of modes from the first mode of the plurality of modes.

10. The method of claim 8, further comprising determining a classification-independent setup time associated with preparing one or more units to be processed in accordance with the materials handling process, wherein determining a classification-independent setup time comprises:
    determining a second plurality of modes of a second frequency distribution for the materials handling process, wherein the second frequency distribution is a distribution of respective time periods determined to be representative of the quantities of labor expended on processing units of another one of said different classifications in accordance with the materials handling process; and
    in response to determining a similarity between a separation of the first mode of the first frequency distribution and another mode of the first frequency distribution of the first data set and a separation of a first mode of the second frequency distribution and another mode of the second frequency distribution, determining the classification-independent setup time based on the first separation and the second separation;
    wherein the first mode of the second frequency distribution is a mode determined to include a largest quantity of time periods relative to the other modes of the second frequency distribution.

11. The method of claim 1, further comprising:
assigning an operation status to the materials handling process, wherein the operation status indicates whether labor for the materials handling process is expended before or after the handling of the plurality of units, wherein said assignment is based on whether the lesser measure of variability is associated with the pre-handling time periods or the post-handling time periods.

12. The method of claim 11, further comprising:
determining that a group of agents does not perform the materials handling process in accordance with the operation status, and that a performance metric of that group of agents is greater than the performance metric for agents that perform the materials handling process in accordance with the operation status;
in response to determining that a group of agents does not perform the materials handling process in accordance with the operation status, and that a performance metric of that group of agents is greater than the performance metric for agents that perform the materials handling process in accordance with the operation status, generating a recommendation to modify one or more of: said operation status or an operating procedure associated with that materials handling process.

13. The method of claim 11, further comprising:
determining that a group of agents does not perform the materials handling process in accordance with the operation status, and that a performance metric of that group of agents is less than the performance metric for agents that perform the materials handling process in accordance with the operation status;
in response to determining that a group of agents does not perform the materials handling process in accordance with the operation status, and that a performance metric of that group of agents is less than the performance metric for agents that perform the materials handling process in accordance with the operation status, generating a recommendation to re-train said group of agents.

14. A system, comprising:
a memory; and
one or more processors coupled to the memory, wherein the memory comprises program instructions executable by the one or more processors to:
receive information associated with a materials handling process that includes handling a plurality of units, wherein the information indicates, for each unit of said plurality of units:
a respective pre-handling time period indicating a period of time between a handling message time for that unit and a handling message time for a previously-handled unit, wherein said pre-handling time period represents a labor expenditure for either the unit or the previously-handled unit; and
a respective post-handling time period indicating a period of time between a handling message time for that unit and a handling message time for a subsequently-handled unit, wherein said post-handling time period represents a labor expenditure for either the unit or the subsequently-handled unit;
wherein said plurality of units includes units of different classifications;
determine a measure of variability of the pre-handling time periods associated with the units of a given classification of said different classifications;
determine a measure of variability of the post-handling time periods associated with each unit of the given classification;
determine that either the measure of variability of the pre-handling time periods or the measure of variability of the post-handling time periods is less than the other; and
indicate either that the pre-handling time periods or that the post-handling time periods, associated with the lesser measure of variability, are representative of quantities of labor expended to process the units of said given classification in accordance with the materials handling process.

15. The system of claim 14, wherein the program instructions are configured to:
determine a common quantity of labor for the units of the given classification, wherein the common quantity of labor is determined based on each time period associated with the lesser measure of variability.

16. The system of claim 15, wherein said common quantity of labor is the mean of the respective time periods associated with the lesser measure of variability.

17. The system of claim 15, wherein the units of the given classification are units of different base classifications, wherein the program instructions are configured to:
for each base classification of the different base classifications, assign said common quantity of labor to that base classification, wherein the common quantity of labor indicates an estimate of the quantity of labor required to process an additional unit of that base classification in accordance with the materials handling process.

18. The system of claim 14, wherein said different classifications are classifications based on physical characteristics of units including characteristics based on one or more of: a weight of a unit or a physical dimension of a unit.

19. The system of claim 14, wherein the received information associated with the materials handling process comprises information collected as part of a normal mode of operation of that materials handling process such that receipt of the information associated with the materials handling process does not introduce additional processing overhead to the materials handling process.

20. The system of claim 14, wherein the program instructions are configured to, for one or more additional classifications of said different classifications, repeat said determining a measure of variability of the pre-handling time periods, said determining a measure of variability of the post-handling time periods, and said determining that each time period associated with the lesser measure of variability is representative of a quantity of labor.

21. The system of claim 14, wherein the program instructions are configured to:
determine a first plurality of modes of a first frequency distribution for the materials handling process, wherein the first frequency distribution is a distribution of each time period associated with the lesser measure of variability;
determine a processing time associated with units of said classification, wherein said processing time is determined based on a subset of the time periods associated with the lesser measure of variability, wherein said subset of time periods corresponds to a first mode of said first plurality of modes, wherein the first mode is determined to include a largest quantity of the time periods associated with the lesser measure of variability relative to the other modes of said first plurality of modes.

22. The system of claim 21, wherein the program instructions are configured to:
determine a classification-dependent setup time associated with preparing units of said given classification to be processed in accordance with the materials handling process, wherein the classification-dependent setup time is determined based on a subset of the respective time periods that corresponds to a different mode of the first plurality of modes from the first mode of the plurality of modes.

23. The system of claim 21, wherein the program instructions are configured to determine a classification-independent setup time associated with preparing one or more units to be processed in accordance with the materials handling process, wherein to determine a classification-independent setup time the program instructions are configured to:
  determine a second plurality of modes of a second frequency distribution for the materials handling process, wherein the second frequency distribution is a distribution of respective time periods determined to be representative of the quantities of labor expended on processing units of another one of said different classifications in accordance with the materials handling process; and
  in response to determining a similarity between a separation of the first mode of the first frequency distribution and another mode of the first frequency distribution of the first data set and a separation of a first mode of the second frequency distribution and another mode of the second frequency distribution, determine the classification-independent setup time based on the first separation and the second separation;
  wherein the first mode of the second frequency distribution is a mode determined to include a largest quantity of time periods relative to the other modes of the second frequency distribution.

24. The system of claim 14, wherein the program instructions are configured to:
  assign an operation status to the materials handling process, wherein the operation status indicates whether labor for the materials handling process is expended before or after the handling of the plurality of units, wherein said assignment is based on whether the lesser measure of variability is associated with the pre-handling time periods or the post-handling time periods.

25. The system of claim 24, wherein the program instructions are configured to:
  determine that a group of agents does not perform the materials handling process in accordance with the operation status, and that a performance metric of that group of agents is greater than the performance metric for agents that perform the materials handling process in accordance with the operation status;
  in response to determining that a group of agents does not perform the materials handling process in accordance with the operation status, and that a performance metric of that group of agents is greater than the performance metric for agents that perform the materials handling process in accordance with the operation status, generate a recommendation to modify one or more of: said operation status or an operating procedure associated with that materials handling process.

26. The system of claim 24, wherein the program instructions are configured to:
  determine that a group of agents does not perform the materials handling process in accordance with the operation status, and that a performance metric of that group of agents is less than the performance metric for agents that perform the materials handling process in accordance with the operation status;
  in response to determining that a group of agents does not perform the materials handling process in accordance with the operation status, and that a performance metric of that group of agents is less than the performance metric for agents that perform the materials handling process in accordance with the operation status, generate a recommendation to re-train said group of agents.

27. A non-transitory computer-readable storage medium, storing program instructions computer-executable on a computer system to:
  receive information associated with a materials handling process that includes handling a plurality of units, wherein the information indicates, for each unit of said plurality of units:
    a respective pre-handling time period indicating a period of time between a handling message time for that unit and a handling message time for a previously-handled unit, wherein said pre-handling time period represents a labor expenditure for either the unit or the previously-handled unit; and
    a respective post-handling time period indicating a period of time between a handling message time for that unit and a handling message time for a subsequently-handled unit, wherein said post-handling time period represents a labor expenditure for either the unit or the subsequently-handled unit;
  wherein said plurality of units includes units of different classifications;
  determine a measure of variability of the pre-handling time periods associated with the units of a given classification of said different classifications;
  determine a measure of variability of the post-handling time periods associated with each unit of the given classification;
  determine that either the measure of variability of the pre-handling time periods or the measure of variability of the post-handling time periods is less than the other; and
  indicate either that the pre-handling time periods or that the post-handling time periods, associated with the lesser measure of variability, are representative of quantities of labor expended to process the units of said given classification in accordance with the materials handling process.

28. The medium of claim 27, wherein the program instructions are configured to:
  determine a common quantity of labor for the units of the given classification, wherein the common quantity of labor is determined based on each time period associated with the lesser measure of variability.

29. The medium of claim 28, wherein said common quantity of labor is the mean of the respective time periods associated with the lesser measure of variability.

30. The medium of claim 28, wherein the units of the given classification are units of different base classifications, wherein the program instructions are configured to:
  for each base classification of the different base classifications, assign said common quantity of labor to that base classification, wherein the common quantity of labor indicates an estimate of the quantity of labor required to process an additional unit of that base classification in accordance with the materials handling process.

31. The medium of claim 27, wherein said different classifications are classifications based on physical characteristics of units including characteristics based on one or more of: a weight of a unit or a physical dimension of a unit.

32. The medium of claim 27, wherein the received information associated with the materials handling process comprises information collected as part of a normal mode of operation of that materials handling process such that receipt of the information associated with the materials handling process does not introduce additional processing overhead to the materials handling process.

33. The medium of claim 27, wherein the program instructions are configured to, for one or more additional classifications of said different classifications, repeat said determining a measure of variability of the pre-handling time periods, said determining a measure of variability of the post-handling time periods, and said determining that each time period associated with the lesser measure of variability is representative of a quantity of labor.

34. The medium of claim 27, wherein the program instructions are configured to:
   determine a first plurality of modes of a first frequency distribution for the materials handling process, wherein the first frequency distribution is a distribution of each time period associated with the lesser measure of variability;
   determine a processing time associated with units of said classification, wherein said processing time is determined based on a subset of the time periods associated with the lesser measure of variability, wherein said subset of time periods corresponds to a first mode of said first plurality of modes, wherein the first mode is determined to include a largest quantity of the time periods associated with the lesser measure of variability relative to the other modes of said first plurality of modes.

35. The medium of claim 34, wherein the program instructions are configured to:
   determine a classification-dependent setup time associated with preparing units of said given classification to be processed in accordance with the materials handling process, wherein the classification-dependent setup time is determined based on a subset of the respective time periods that corresponds to a different mode of the first plurality of modes from the first mode of the plurality of modes.

36. The medium of claim 34, wherein the program instructions are configured to determine a classification-independent setup time associated with preparing one or more units to be processed in accordance with the materials handling process, wherein to determine a classification-independent setup time the program instructions are configured to:
   determine a second plurality of modes of a second frequency distribution for the materials handling process, wherein the second frequency distribution is a distribution of respective time periods determined to be representative of the quantities of labor expended on processing units of another one of said different classifications in accordance with the materials handling process; and
   in response to determining a similarity between a separation of the first mode of the first frequency distribution and another mode of the first frequency distribution of the first data set and a separation of a first mode of the second frequency distribution and another mode of the second frequency distribution, determine the classification-independent setup time based on the first separation and the second separation;
   wherein the first mode of the second frequency distribution is a mode determined to include a largest quantity of time periods relative to the other modes of the second frequency distribution.

37. The medium of claim 27, wherein the program instructions are configured to:
   assign an operation status to the materials handling process, wherein the operation status indicates whether labor for the materials handling process is expended before or after the handling of the plurality of units, wherein said assignment is based on whether the lesser measure of variability is associated with the pre-handling time periods or the post-handling time periods.

38. The medium of claim 37, wherein the program instructions are configured to:
   determine that a group of agents does not perform the materials handling process in accordance with the operation status, and that a performance metric of that group of agents is greater than the performance metric for agents that perform the materials handling process in accordance with the operation status;
   in response to determining that a group of agents does not perform the materials handling process in accordance with the operation status, and that a performance metric of that group of agents is greater than the performance metric for agents that perform the materials handling process in accordance with the operation status, generate a recommendation to modify one or more of: said operation status or an operating procedure associated with that materials handling process.

39. The medium of claim 37, wherein the program instructions are configured to:
   determine that a group of agents does not perform the materials handling process in accordance with the operation status, and that a performance metric of that group of agents is less than the performance metric for agents that perform the materials handling process in accordance with the operation status;
   in response to determining that a group of agents does not perform the materials handling process in accordance with the operation status, and that a performance metric of that group of agents is less than the performance metric for agents that perform the materials handling process in accordance with the operation status, generate a recommendation to re-train said group of agents.

* * * * *